United States Patent Office 2,822,216
Patented Feb. 4, 1958

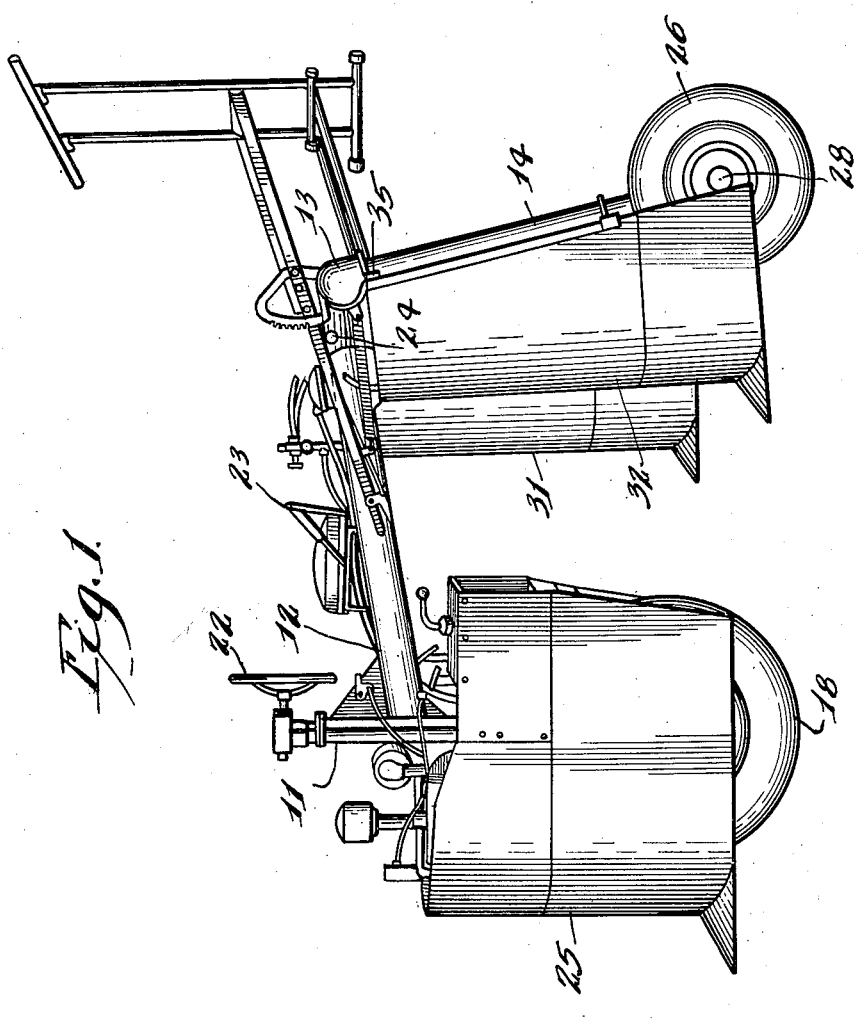

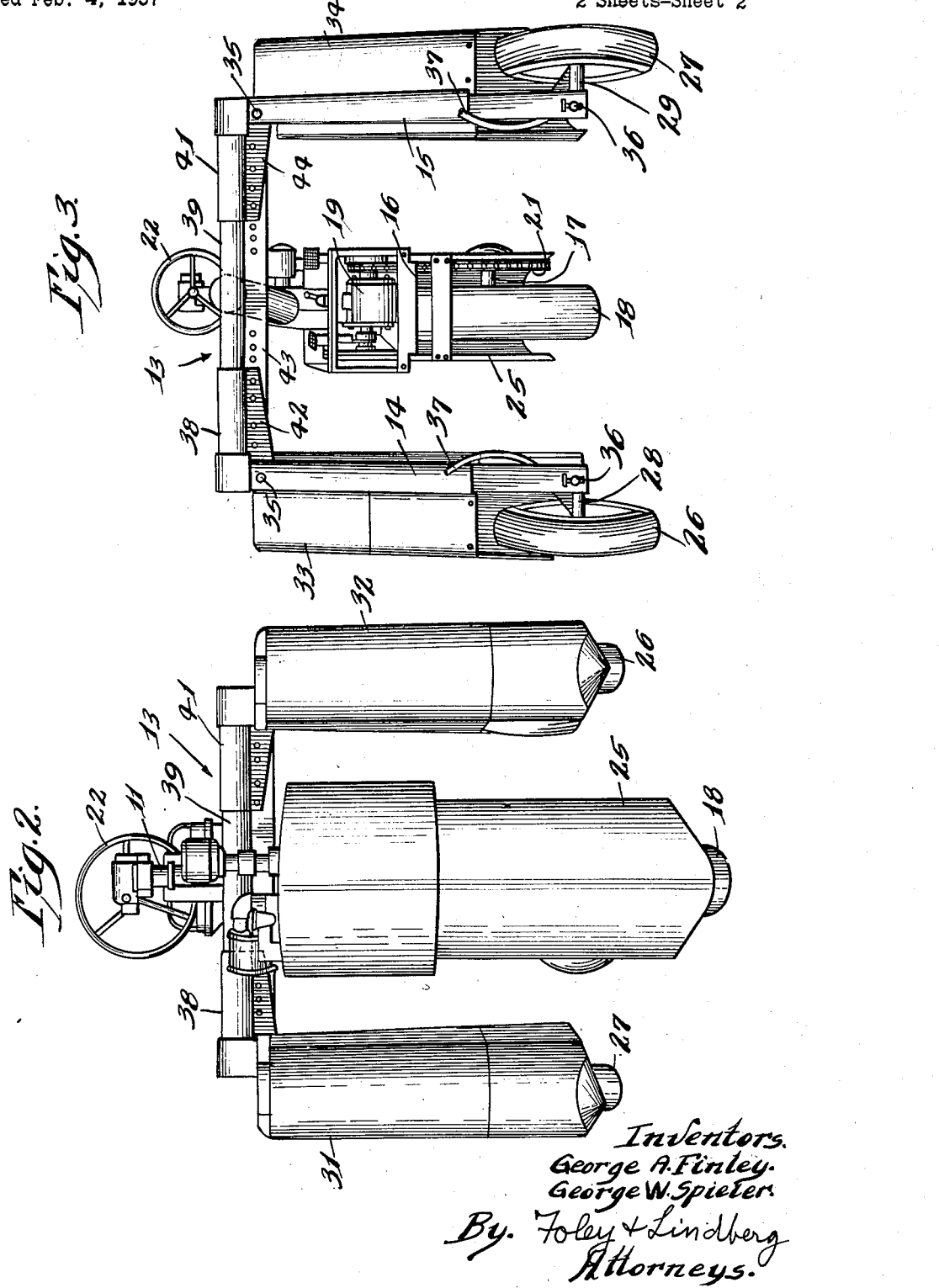

2,822,216

SPRAY VEHICLE

George A. Finley and George W. Spieler, Aurora, Ill., assignors to Finco, Inc., Aurora, Ill., a corporation of Illinois Application February 4, 1957, Serial No. 638,092

6 Claims. (Cl. 299—29)

This invention relates to improvements in self-propelled vehicular sprayers for use in the spraying of row crops such as cotton and corn and other crops which advantageously may be sprayed for insect control.

While there are diverse types of spraying equipment designed and well adapted for use on row crops, this invention relates to a self-propelled vehicle particularly designed for spraying and especially well adapted both for high level spraying of bushy, leafy crops and low level spraying of younger crops.

One of the objects of this invention is to provide a self-propelled sprayer which may move through high-level row crops with a minimum of damage to them.

Another object of the invention is to provide such a machine having a sturdy frame and combining with that frame certain liquid storage facilities designed to yield a number of new advantages.

Another object of the invention is to provide in such a self-propelled vehicle substantial protection for high level, bushy row crops combined with liquid storage facilities arranged additionally to be consistent with stability.

Another object of the invention is to provide, in a vehicle of the class described, a propelling unit consisting of a single directly driven wheel at the forward end, which wheel will support an internal combustion engine and be steerable, thus reserving the space and structure of the rear part of the vehicle for the use of the spray apparatus and facilities.

Other objects and advantages of the invention will be mentioned hereinafter or become apparent from a perusal of this specification.

To illustrate the nature and use of this invention a preferred embodiment thereof is shown in the drawings.

Figure 1 is a perspective view of the vehicle from one side;

Figure 2 is a perspective view of the front end of the vehicle; and

Figure 3 is a perspective view of the rear end of the vehicle.

In the drawings, the main frame members of the vehicle are indicated as the front column 11, the longitudinal brace 12, the cross brace generally designated as 13, and the rear leg braces 14 and 15. All of these designated members are tubular structures, welded together at their junctures, and constituting a rigid and durable main frame.

The front column provides a housing and bearing support for a vertically extending post 16, the lower end of which is fixed to a bearing sleeve 17 in which rotates a horizontal shaft (not shown) on which is fixed the front wheel, whose tire 18 is shown. The rotatable post 16 also has secured to it a suitable bracket (not shown) on which is fixed and supported an internal combustion engine 19 together with clutch and gear shift mechanisms through which is driven a chain 21 engaged with a sprocket gear fixed on the front wheel shaft. By suitably forming the post 16 with a lower portion laterally offset from its axis of rotation within the column 11 the center of the front wheel can be located appropriately in line with that axis, which arrangement is desirable for steering and traction purposes.

To provide for manual control of such steering, a steering wheel 22 carries on its shaft a worm gear meshing with a gear fixed within column 11 on the upper end of post 16. This steering wheel is within convenient reach of a seat 23 positioned on and secured to the longitudinal brace 12.

Instead of superposing a conventional gasoline tank somewhere on the frame of the machine the hollow tubular brace 12 itself is used as the gas tank and is provided with a filling opening at 24, while an armored flexible gasoline hose (not shown) may be used to supply the engine from the storage tank.

The steerable front wheel power unit is provided with a wrap-around shield 25, which affords general protection to the motor, the wheel and associated mechanisms but also serves to gently part overhanging branches and foliage of row crops which have reached a high stage of growth. This shield is supported on the front unit integrally with the motor and turns with the unit.

The rear wheels 26 and 27 are rotatably supported on stub axles 28 and 29, and are partially enclosed within protective shields 31 and 32. Within these shields are positioned large spray liquid supply tanks 33 and 34, and, preferably, the shields themselves constitute a major portion of the outer wall of these tanks. Thus the shields not only part the foliage of high level crops in advance of the rear wheels and frame braces 14 and 15, but also house or become part of the storage tanks for the liquid spray.

By locating the liquid supply tanks as shown the weight of the liquid, which is considerable when they are more than half full, is disposed at a low level relatively to the highest points on the vehicle frame, and in this manner the stability of this type of machine is greatly increased.

By locating the propelling unit well in advance of these tanks carried by the rear leg braces there is no compression of the plant foliage between opposed parts of the vehicle. In some prior vehicles such compression has been unavoidable, and the damage to foliage, cotton bolls and even dislodging of cotton bolls has been serious.

Some of the currently used liquid sprays are extremely harmful and poisonous to man and readily are absorbed by his skin with fast and dangerous results. Experience has shown that even the most careful operator will get some of this liquid on his hands or face. The best remedy is to wash the spray off immediately with clean water, and for this purpose the hollow tubular braces 14 and 15 are provided with filling openings 35, suitably capped and drain valves 36. Operators are cautioned to keep these fresh water tanks supplied with water for this single purpose.

The large tanks are equipped with filling openings (not shown) and hoses 37 connectable with the spray pump and system of pipes and nozzles. As the spray system does not constitute a part of this invention it is not shown in detail. Any suitable spray system may be used and may have a pump directly or indirectly driven by the motor 19 to which may be connected distribution pipes and spray nozzles controllable by the operator.

The cross brace generally designated as 13, instead of being a single pipe, consists of three telescoping pipes 38, 39 and 41, the middle pipe having a sliding fit within the other two. Depending webs 42, 43 and 44 welded to these pipe sections in overlapping relation are provided with a plurality of spaced bolt holes. By causing selected holes to register and then bolting the webs together the spacing of the rear wheels and the large liquid tanks carried by them can be varied to suit the spacing of the row crops being treated. Planters do not all employ the same row spacing and even one planter may vary the spacing of his crops in a single year or from year to year.

It will be observed that the vehicle is free of appendages or equipment which would interfere with the vision of the operator or with the easy passage of the machine through high level, spreading row crops.

While a preferred embodiment of the invention has been shown and described herein, it should be understood that the invention is susceptible of considerable variation without departing from the scope of the appended claims.

Having shown and described the invention,

We claim:

1. A self-propelled spray vehicle comprising a front vertical tubular column and a rotatable post housed therein, a steering wheel supported on said column and gear means operatively connecting the wheel and post, the post having a lower portion laterally offset from the post axis and a stub axle on said portion, a traction wheel on said axle, a motor supported on said post and turnable therewith, driving means connecting the motor with said wheel, a tubular central frame member secured to said column extending rearwardly therefrom and constituting a gasoline reservoir, a rear transverse tubular frame unit welded to said central member, two tubular frame members welded to opposite ends of the transverse unit and depending therefrom, stub axles fixed on the lower end portions of said depending tubes and wheels on said axles, liquid spray storage tanks supported on said depending members and shaped at their forward edges for gently parting the foliage of bushy row crops, and a shield embracing said motor and front wheel shaped in its forward edge for gently parting the foliage of said row crops.

2. A self-propelled three-wheeled spray vehicle comprising a front frame member and a steerable wheel post connected therewith, a motor and wheel supported on said wheel post and driving connections between said motor and wheel, a central longitudinal hollow frame member rigidly connected with the upper end portion of said front frame member and providing a motor fuel storage chamber, a rear transverse frame unit having its central portion rigidly connected with said longitudinal member, a pair of tubular legs rigidly secured at their upper ends to the lateral ends of said transverse unit and depending therefrom, stub axles fixed on the lower end portions of said depending legs and wheels on said axles, liquid spray storage tanks supported on said depending legs and shaped at their forward edges for gently parting the foliage of bushy row crops, and a shield embracing said motor and front wheel shaped in its forward edge for gently parting the foliage of said row crops.

3. A self-propelled spray vehicle comprising a front vertical tubular column and a rotatable post housed therein, a steering wheel supported on said column and gear means operatively connecting the wheel and post, the post having a lower portion laterally offset from the post axis and a stub axle on said portion, a traction wheel on said axle, a motor supported on said post and turnable therewith, driving means connecting the motor with said wheel, a tubular central frame member secured to said column extending rearwardly therefrom and constituting a gasoline reservoir, a rear transverse tubular frame unit welded to said central member, two tubular frame members welded to opposite ends of the transverse unit and depending therefrom, at least one of said depending members providing a storage space for wash water, stub axles fixed on the lower end portions of said depending tubes and wheels on said axles, liquid spray storage tanks supported on said depending members and shaped at their forward edges for gently parting the foliage of bushy row crops, and a shield embracing said motor and front wheel shaped in its forward edge for gently parting the foliage of said row crops.

4. A self-propelled three-wheeled spray vehicle comprising a front frame member and a steerable wheel post connected therewith, a motor and wheel supported on said wheel post and driving connections between said motor and wheel, a central longitudinal hollow frame member rigidly connected with the upper end portion of said front frame member and providing a motor fuel storage chamber, a rear transverse frame unit having its central portion rigidly connected with said longitudinal member, a pair of tubular legs rigidly secured at their upper ends to the lateral ends of said transverse unit and depending therefrom, stub axles fixed on the lower end portions of said depending legs and wheels on said axles, liquid spray storage tanks supported on said depending legs and shaped at their forward edges for gently parting the foliage of bushy row crops, and a shield embracing said motor and front wheel shaped in its forward edge for gently parting the foliage of said row crops, the said front shield having its trailing edges located well in advance of said spray storage tanks to thus avoid lateral compression of crop foliage in a single row between said shield and either tank.

5. A self-propelled three-wheeled spray vehicle comprising a front frame member and a steerable wheel post connected therewith, a motor and wheel supported on said wheel post and driving connections between said motor and wheel, a central longitudinal hollow frame member rigidly connected with the upper end portion of said front frame member and providing a motor fuel storage chamber, a rear transverse frame unit having its central portion rigidly connected with said longitudinal member, a pair of tubular legs rigidly secured at their upper ends to the lateral ends of said transverse unit and depending therefrom, stub axles fixed on the lower end portions of said depending legs and wheels on said axles, liquid spray storage tanks supported on said depending legs and shaped at their forward edges for gently parting the foliage of bushy row crops, and a shield embracing said motor and front wheel shaped in its forward edge for gently parting the foliage of said row crops, the central portion of said transverse unit being a tube having a web projecting from its outer surface, the lateral ends of said transverse unit being tubes having a telescopic fit with the central portion and each having webs projecting therefrom in overlapping relation with the first said web, and means for adjustably securing said webs together for varying the total length of said unit.

6. A self-propelled three-wheeled spray vehicle comprising a front frame member and a steerable wheel post connected therewith, a motor and wheel supported on said wheel post and driving connections between said motor and wheel, a central longitudinal rigid frame member rigidly connected with the upper end portion of said front frame member, a rear transverse frame unit having its central portion rigidly connected with said longitudinal member, a pair of rigid legs rigidly secured at their upper ends to the lateral ends of said transverse unit and depending therefrom, axles supported on the lower end portions of said depending legs and wheels on said axles, liquid spray storage tanks supported on said depending legs and shaped at their forward edges for gently parting the foliage of bushy row crops, and a shield embracing said motor and front wheel shaped in its forward edge for gently parting the foliage of said row crops.

References Cited in the file of this patent

UNITED STATES PATENTS

| | | |
|---|---|---|
| 2,107,382 | Maddock | Feb. 8, 1936 |
| 2,131,306 | Walker | Sept. 27, 1938 |
| 2,504,403 | Finley | Apr. 18, 1950 |
| 2,530,053 | Glass | Nov. 14, 1950 |
| 2,647,795 | Kucera | Aug. 4, 1953 |